(12) United States Patent
Zhu et al.

(10) Patent No.: US 11,745,639 B2
(45) Date of Patent: Sep. 5, 2023

(54) HEADLAMP OPTICAL ELEMENT, HEADLAMP MODULE, VEHICLE LAMP AND VEHICLE

(71) Applicant: HASCO VISION TECHNOLOGY CO., LTD., Shanghai (CN)

(72) Inventors: He Zhu, Shanghai (CN); Zhiping Qiu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 107 days.

(21) Appl. No.: 17/416,027

(22) PCT Filed: Jan. 13, 2021

(86) PCT No.: PCT/CN2021/071515
§ 371 (c)(1),
(2) Date: Jun. 18, 2021

(87) PCT Pub. No.: WO2021/147732
PCT Pub. Date: Jul. 29, 2021

(65) Prior Publication Data
US 2022/0324374 A1 Oct. 13, 2022

(30) Foreign Application Priority Data
Jan. 20, 2020 (CN) .......................... 202020137908.8

(51) Int. Cl.
*F21S 41/43* (2018.01)
*B60Q 1/04* (2006.01)
(Continued)

(52) U.S. Cl.
CPC .............. *B60Q 1/04* (2013.01); *F21S 41/141* (2018.01); *F21S 41/285* (2018.01); *F21S 41/37* (2018.01);
(Continued)

(58) Field of Classification Search
CPC ................. B60Q 1/04; F21W 2102/14; F21W 2102/135; F21W 2102/13; F21W 2107/10;
(Continued)

(56) References Cited

U.S. PATENT DOCUMENTS

2013/0107564 A1   5/2013   Yatsuda
2014/0085919 A1*  3/2014   Tsai ...................... F21S 41/143
                                                              362/522
(Continued)

FOREIGN PATENT DOCUMENTS

CN       106439672 A  *  2/2017   ............ F21S 41/255
CN       106439672 A       2/2017
(Continued)

OTHER PUBLICATIONS

Search English translation of CN 106439672 A (Year: 2017).*
(Continued)

*Primary Examiner* — Omar Rojas Cadima
(74) *Attorney, Agent, or Firm* — Volpe Koenig

(57) ABSTRACT

The present disclosure relates to a headlamp optical element comprising a light collecting part, a light emitting part and a reflecting part connected in sequence. The reflecting part comprises a low beam or high beam cutoff line structure. The end of the light collecting part comprises an outer contour surface and a concave cavity including a cambered front light incident surface and a lateral light incident surface that is curved with a smaller circumference closer to the reflecting part. The outer contour surface is curved with a larger circumference closer to the reflecting part. A lower portion of the light collecting part is provided with a region III light-shape forming structure, wherein part of light converged can be emitted from region III and under the reflecting part in sequence forming a light-shape of a low (Continued)

beam region III. The headlamp optical element is simple, compact, and lighter in weight.

19 Claims, 14 Drawing Sheets

(51) Int. Cl.
  *F21S 41/47* (2018.01)
  *F21S 41/37* (2018.01)
  *F21S 41/141* (2018.01)
  *F21S 41/20* (2018.01)
  *F21S 41/39* (2018.01)
  *F21S 41/60* (2018.01)
  *F21Y 115/10* (2016.01)
  *F21W 102/14* (2018.01)

(52) U.S. Cl.
  CPC ............... *F21S 41/39* (2018.01); *F21S 41/43* (2018.01); *F21S 41/47* (2018.01); *F21S 41/60* (2018.01); *F21W 2102/14* (2018.01); *F21Y 2115/10* (2016.08)

(58) Field of Classification Search
  CPC .. F21W 2102/00; F21S 41/143; F21S 41/285; F21S 41/60; F21S 41/322; F21S 41/365; F21S 41/265; F21S 41/32; F21S 41/147; F21S 41/151; F21S 41/24; F21S 41/25; F21S 41/275; F21S 43/31; F21S 43/235; F21Y 2115/10
  See application file for complete search history.

(56) References Cited

U.S. PATENT DOCUMENTS

| | | | |
|---|---|---|---|
| 2014/0321143 | A1 | 10/2014 | Hossfeld et al. |
| 2017/0211771 | A1* | 7/2017 | Nishimura ............... F21S 41/40 |
| 2017/0292671 | A1* | 10/2017 | Gousset-Rousseau ..................... F21S 41/153 |
| 2018/0313511 | A1* | 11/2018 | Lee ........ F21S 41/141 |
| 2019/0086050 | A1* | 3/2019 | Dikau .................... F21S 41/322 |

FOREIGN PATENT DOCUMENTS

| | | |
|---|---|---|
| CN | 205956991 U | 2/2017 |
| CN | 108534078 A | 9/2018 |
| CN | 108662539 A | 10/2018 |
| CN | 108758547 A | 11/2018 |
| CN | 110220158 A | 9/2019 |
| CN | 110397889 A | 11/2019 |
| CN | 211694701 U | 10/2020 |
| DE | 102007052696 A1 | 7/2008 |
| EP | 2799761 A2 | 11/2014 |
| EP | 3232118 A1 | 10/2017 |
| GB | 4599-2007 | 6/2012 |
| JP | 2008077890 A | 4/2008 |
| WO | 2014033834 A1 | 3/2014 |
| WO | 2017198516 A1 | 11/2017 |
| WO | 2019211120 A1 | 11/2019 |

OTHER PUBLICATIONS

PDF format of international search report of the present application PCT/CN2021/071515 and English translation of written opinion therein.

* cited by examiner

HEADLAMP OPTICAL ELEMENT, HEADLAMP MODULE, VEHICLE LAMP AND VEHICLE

CROSS REFERENCE TO RELATED APPLICATIONS

This application is a 35 USC § 371 National Stage application of International Patent Application No. PCT/CN2021/071515, which was filed Jan. 13, 2021, entitled "HEADLAMP OPTICAL ELEMENT, HEADLAMP MODULE, VEHICLE LAMP AND VEHICLE" and claims priority to Chinese Patent Application No. 202020137908.8, filed Jan. 20, 2020, all of which are incorporated herein by reference as if fully set forth.

TECHNICAL FIELD

The present disclosure relates to a vehicle lighting device, in particular to a headlamp optical element. In addition, the present disclosure further relates to a headlamp module, a vehicle lamp and a vehicle.

BACKGROUND

In recent years, vehicle lamps and headlamp modules assembled in vehicle lamps have been rapidly developed. From the early halogen lamps to the later xenon lamps, to the current LED and laser light sources, the vehicle lamps have become more intelligent, and are differentiated in shape. Among various vehicle lamp light sources, LED light sources are gradually getting the attention of vehicle manufacturers due to the advantages of excellent performance and low cost. With the development of LED light sources, their light distribution structures are gradually developing.

In the prior art, an LED light source projection type lighting system commonly used in a vehicle lamp generally includes a light source, a reflecting element, a light shielding plate and an optical lens. Light emitted by the light source is reflected by the reflecting element and then emitted to the light shielding plate, after being intercepted by the light shielding plate, the light is projected by the optical lens to form a quasi-parallel light illumination light shape with a cutoff line. However, due to the large light emitting angle of the LED light source, the reflecting element has to be arranged in a size which have a large coverage range relative to the light emitting angle of the light source in order to ensure a certain system light effect, which is in prominent contradiction with the trend of increasingly compact vehicle shapes in the future.

In recent years, condensers have been further applied to vehicle headlamp modules, which makes the forms of headlamps more diverse. An existing condenser is provided with a light guide channel extending in a front-to-rear direction, the light guide channel is of a solid light guide body structure, and light is refracted and reflected by the condenser, then emitted to the optical lens and projected by the optical lens to form an illumination light shape. However, due to the large size of the light guide channel of the condenser, the module is heavier in weight and higher in cost. Therefore, a compact, lightweight and efficient optical system is required to meet the strong market demand.

In view of the above-mentioned defects of the prior art, it is necessary to design a novel illumination optical element.

SUMMARY

The technical problem to be solved in the first aspect of the present disclosure is to provide a headlamp optical element, which is simple and compact in structure and lighter in weight.

The technical problem to be solved in the second aspect of the present disclosure is to provide a headlamp module, which is smaller in size and lighter in weight.

The technical problem to be solved in the third aspect of the present disclosure is to provide a vehicle lamp, which is smaller in size, lighter in weight and simple and compact in structure.

The technical problem to be solved in the fourth aspect of the present disclosure is to provide a vehicle having a vehicle lamp being smaller in size, lighter in weight and simple and compact in structure.

In order to achieve the above objectives, in the first aspect, the present disclosure provides a headlamp optical element, which includes a light collecting part, a light emitting part and a reflecting part which are sequentially connected along a light emitting direction, wherein one end of the reflecting part is connected with a lower portion of the light emitting part, and the other end of the reflecting part is provided with a low beam cutoff line structure for forming a low beam cutoff line; or one end of the reflecting part is connected with an upper portion of the light emitting part, and the other end of the reflecting part is provided with a high beam cutoff line structure for forming a high beam cutoff line; the low beam cutoff line structure is arranged on a front edge of the reflecting surface of the reflecting part; the light collecting parts are of light concentrating cup structures, an inner concave cavity is arranged at the end of the light collecting part away from the reflecting part, each concave cavity includes a front light incident surface and a lateral light incident surface, the front light incident surface is a curved surface protruding to the side away from the reflecting part, the lateral light incident surface is a curved surface of which the circumference gradually decreases from an end away from the reflecting part to an end close to the reflecting part, and an outer contour surface of each light collecting part is a curved surface of which the circumference gradually increases from the end away from the reflecting part to the end close to the reflecting part; and lower portion of the light collecting part is provided with region III light shape forming structure, part of light converged by the light collecting part can be emitted from the region III light shape forming structures and emitted under the reflecting part to form the light shape of the low beam region III.

Preferably, a 50L dark region forming structure is formed on the reflecting surface provided with the low beam cutoff line structure of the reflecting part, and light emitted from the light emitting part to the 50L dark region forming structure can be reflected and refracted by the 50L dark region forming structure so that the brightness of the low beam 50L region can be lowered.

Preferably, the end surface of the end of the reflecting part away from the light collecting parts is a smooth concave arc-shaped curved surface with a continuous curvature.

Preferably, the number of the light collecting parts is two or more.

Preferably, the reflecting surface of the reflecting part is provided with a reflection enhancing layer.

In the second aspect, the present disclosure provides a headlamp module, which includes the headlamp optical element according to any one of the technical solutions in the first aspect and a lens, wherein the headlamp optical element and the lens are in a split structure, and the lens is arranged in the light emitting direction of the headlamp optical element; or the headlamp optical element and the lens are in an integrated structure, and the lens and the headlamp optical element are connected through connecting plates.

Preferably, the low beam cutoff line structure or the high beam cutoff line structure is located in a region defined from a part at 10 mm above to a part at 10 mm below an optical axis of the lens.

Further preferably, the lens is a convex lens or a Fresnel lens structure.

In the third aspect, the present disclosure provides a vehicle lamp, which includes the headlamp module according to any one of the above technical solutions.

In the fourth aspect, the present disclosure provides a vehicle, which includes the vehicle lamp according to any one of the above technical solutions.

In the basic technical solution of the present disclosure, the headlamp optical element includes the light collecting parts, the light emitting part and the reflecting part which are connected in sequence. By adjusting the relative positions of the light collecting parts and the reflecting part, the headlamp optical element can be applied to low beam illumination or high beam illumination respectively. When the headlamp optical element is in a low beam structure, one end of the reflecting part is connected with the lower portion of the light emitting part, and the other end of the reflecting part is provided with the low beam cutoff line structure for forming the low beam cutoff line; and when the headlamp optical element is in a high beam structure, one end of the reflecting part is connected with the upper portion of the light emitting part, and the other end of the reflecting part is provided with the high beam cutoff line structure for forming the high beam cutoff line. A light source is arranged at the light collecting part, and divergent light emitted by the light source is converged by the light collecting parts and converged light is emitted through the light emitting part, wherein part of light is emitted forward, and the other part of light is emitted forward after being reflected by the reflecting part. The headlamp optical element adopting this structure is small in space occupation volume, and the space utilization efficiency is greatly improved; and the process requirement of integral forming can be met, so that the position accuracy of optical surfaces on an optical path propagation path is improved, the structure is relatively simplified, and the headlamp optical element is lighter in weight.

Other advantages of the present disclosure and the technical effects of the preferred embodiments will be further described in the following specific embodiments.

| Brief Description of the Symbols: | |
|---|---|
| 1 - Headlamp optical element | 11 - Light collecting part |
| 111 - Front light incident surface | 112 - Lateral light incident surface |
| 113 - Outer contour surface | 12 - Light emitting part |
| 13 - Reflecting part | 14 - Region III light shape forming structure |
| 15 - Low beam cutoff line structure | 16 - 50L dark region forming structure |
| 17 - High beam cutoff line structure | 2 - Lens |
| 21 - Optical axis | 3 - Connecting plate |
| 4 - Light source | 51 - Low beam cutoff line |
| 52 - High beam cutoff line | 53 - Region III |
| 54 - 50L region | |

DETAILED DESCRIPTION OF THE EMBODIMENTS

The specific embodiments of the present disclosure will be described in detail below with reference to the accompanying drawings. It should be understood that the specific embodiments described here are only used to illustrate and explain the present disclosure, and are not used to limit the present disclosure.

In the description of the present disclosure, it should be noted that the terms "install", "connect" and "arrange" should be interpreted broadly unless otherwise clearly specified and limited. For example, it may be fixed connection or detachable connection or integral connection; and it may be direct connection or indirect connection through an intermediate medium, and it may be internal communication of two elements or shows interaction relationship between two elements. Those of ordinary skill in the art can understand the specific meanings of the above-mentioned terms in the present disclosure according to the specific situations.

Figure 1:
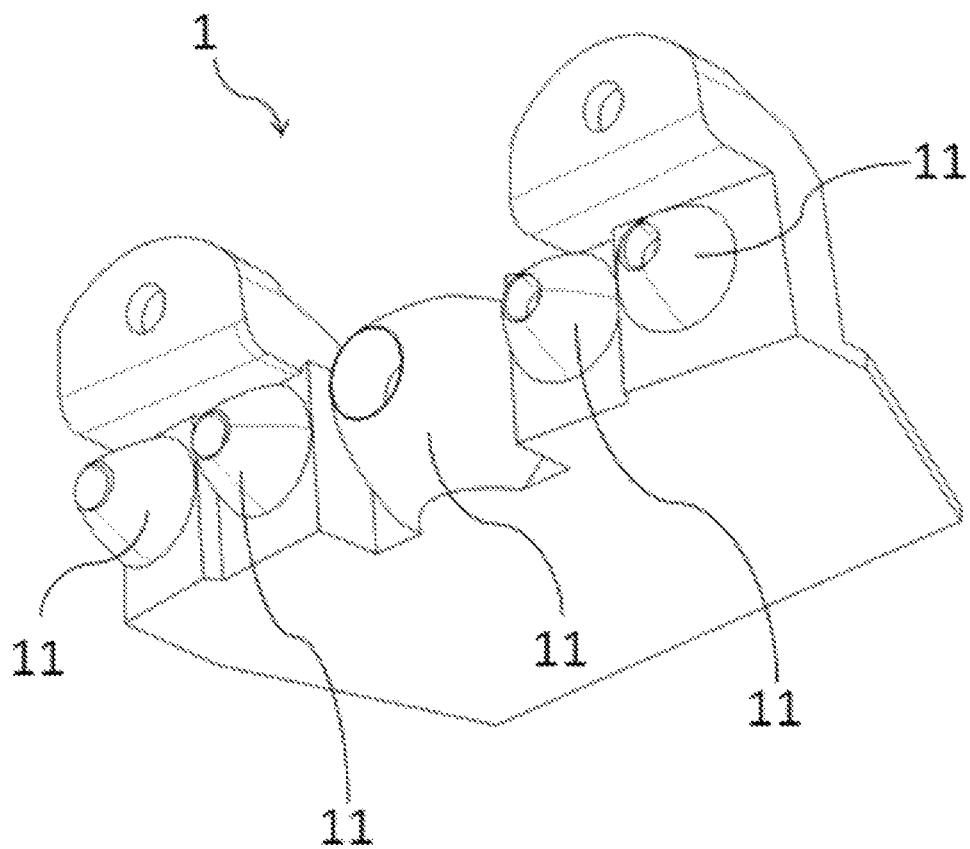
FIG. 1 is a structural schematic diagram I of a first embodiment of a headlamp optical element of the present disclosure.
Figure 2:
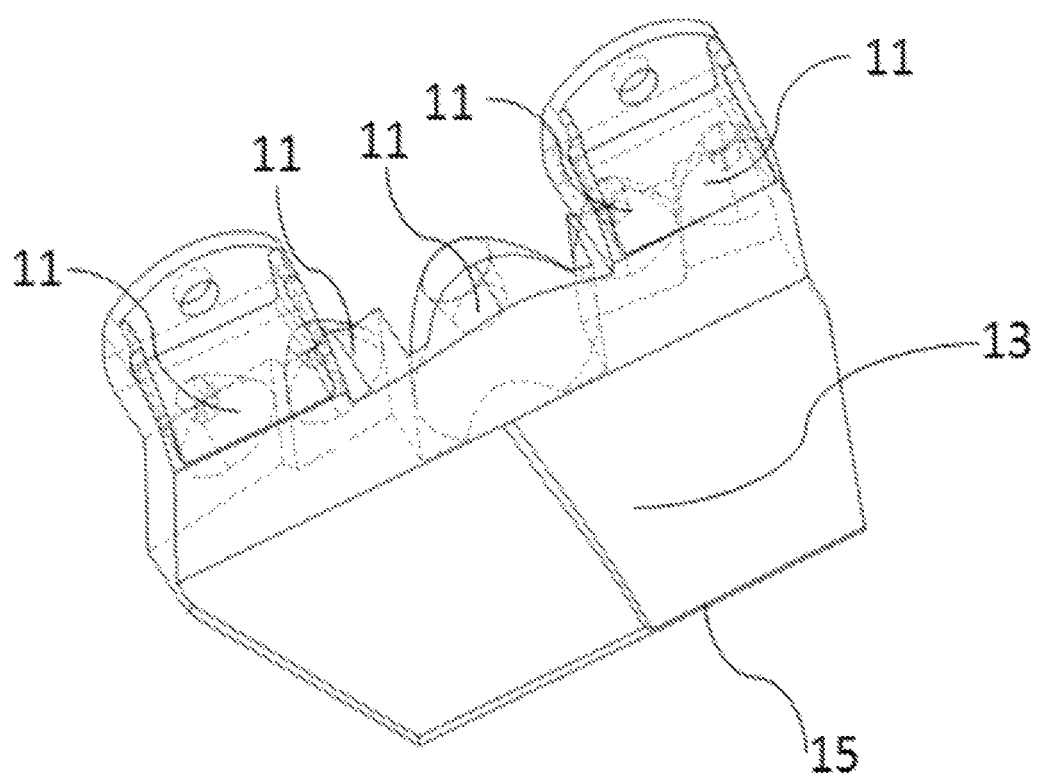
FIG. 2 is a structural schematic diagram II of the first embodiment of the headlamp optical element of the present disclosure.
Figure 3:
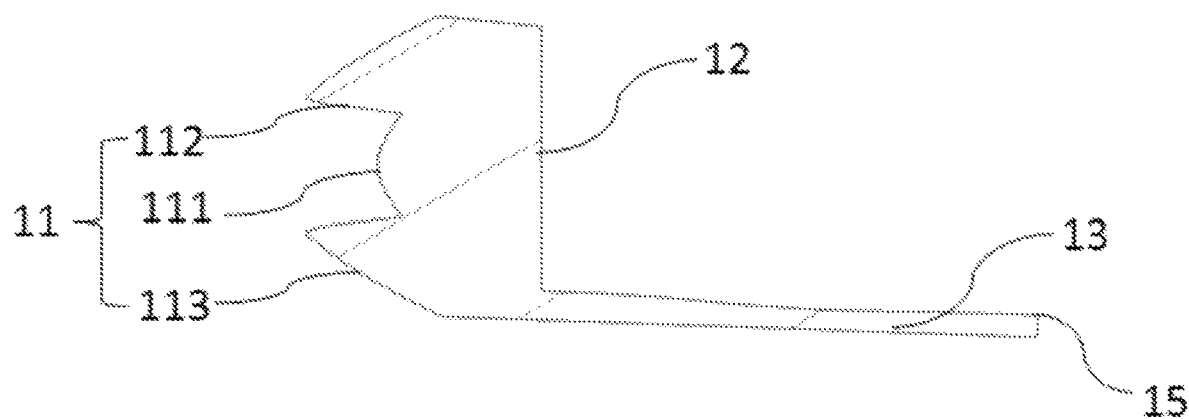
FIG. 3 is a structural schematic diagram III of the first embodiment of the headlamp optical element of the present disclosure.

It should be understood that, as shown in FIG. 3, based on the headlamp optical element 1, along the light emitting direction, "front" refers to an end, where a low beam cutoff line structure 15 or a high beam cutoff line structure 17 is formed, of a reflecting part 13, "rear" refers to an end where light collecting parts 11 are located, when the headlamp optical element 1 is normally installed on a vehicle lamp, "above" refers to being above the light emitting direction, "below" refers to being above the light emitting direction, and the "left" and "right" orientations can be determined on the basis of the above-mentioned "above", "below", "front" and "rear". It should be noted that the optical axis 21 is a virtual axis which passes through the focal point of the lens 2 and extends in the front-to-rear direction; according to the definition of GB4599-2007-Motor vehicle headlamps equipped with filament lamps: a cutoff line is a boundary line of the significant bright and dark changes sensed visually when light beams are projected onto a light distribution screen, the low beam cutoff line 51 refers to an upper boundary of the low beam light shape of the vehicle lamp, and the high beam cutoff line 52 refers to a lower boundary of the high beam light shape of the vehicle lamp; the regulation has specific restrictions on the brightness of the 50L region 54 of the low beam, namely 50L≤151x; and the low beam light shape has an important part called "region III 53" which is located above the low beam cutoff line 51 and is mainly used for illuminating signs and other objects located above the road surface to enable drivers to obtain information of signs and the like. In the actual installation situation, the orientation terms should be explained based on the actual installation state in combination with the headlamp optical element 1 as the reference. The terms are based on the orientation or positional relationship shown in the accompanying drawings, are only for the convenience of describing the present disclosure and simplifying the description, rather than indicating or implying that the mentioned device or element must have a specific orientation, be constructed and operated in a specific orientation, and therefore cannot be understood as a limitation of the present disclosure.

Referring to FIGS. 1 to 5, a headlamp optical element 1 of the present disclosure includes a light collecting part 11, a light emitting part 12 and a reflecting part 13 which are connected in sequence. When the headlamp optical element 1 adopts a low beam structure, referring to FIGS. 1 to 4, one end of the reflecting part 13 is connected to a lower portion of the light emitting part 12, and the other end of the reflecting part 13 is provided with a low beam cutoff line structure 15 for forming a low beam cutoff line 51; when the headlamp optical element 1 adopts a high beam structure, referring to FIG. 5, one end of the reflecting part 13 is connected to an upper portion of the light emitting part 12, and the other end of the reflecting part 13 is provided with a high beam cutoff line structure 17 for forming a high beam cutoff line 52, wherein the reflecting part 13 is provided with a reflecting surface, the reflecting surface is an optical surface for reflecting part of light emitted by the light emitting part 12, the low beam cutoff line structure 15 and the high beam cutoff line structure 17 are formed on a front edge of the reflecting surface of the reflecting part 13, the low beam cutoff line structure 15 and the high beam cutoff line structure 17 can intercept light so that a low beam light shape and a high beam light shape of a vehicle lamp are provided with the low beam cutoff line 51 and the high beam cutoff line 52 in specific shapes, the shape of the low beam cutoff line 51 is formulated according to different regulations or different requirements of different countries, regions and vehicle manufacturers and is not limited to the shapes shown in the figures, and the high beam cutoff line 52 is connected well up and down with the low beam cutoff line 51. Light source 4 is arranged at the light collecting part 11. The light collecting part 11 converges divergent light emitted by the light source 4 and emit light through the light emitting part 12, wherein part of light is directly emitted to a lens 2, and the other part of light is reflected by the reflecting part 13 and then emitted to the lens 2, and the two parts of light form the low beam light shape or the high beam light shape after being projected by the lens 2. The light sources 4 are preferably LED light sources; and the light collecting parts 11 are light concentrating cup structures. After light emitted by the light source 4 is converged by the light collecting part 11, a light beam with a small angle can be formed, so that light emitted by the light source 4 can be completely or mostly incident to the lens 2, the size of the lens 2 can be reduced while achieving higher light efficiency, and thus a headlamp module tends to be miniaturized. The headlamp optical element 1 adopting this structure is more lightweight and smaller in space occupation volume, and the space utilization efficiency is greatly improved; and the process requirement of integral forming can be met, so that the position accuracy of optical surfaces on an optical path propagation path is improved, and the structure is relatively simplified.

Figure 6:
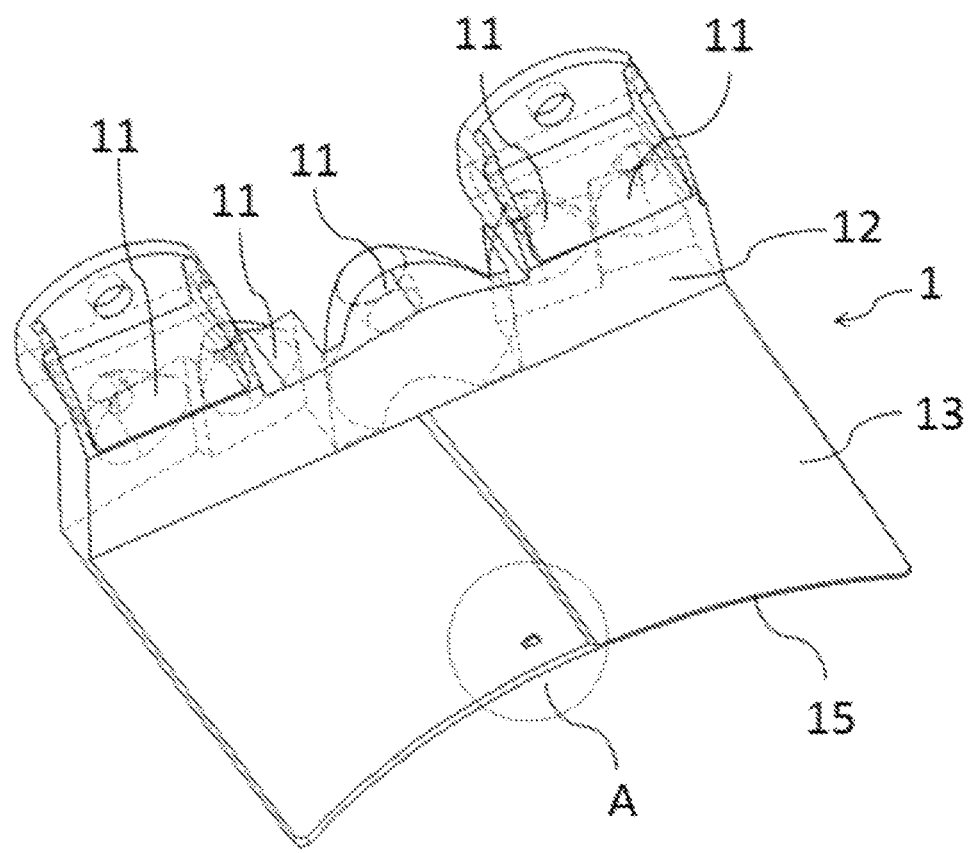
FIG. 6 is a structural schematic diagram I of a fourth embodiment of the headlamp optical element of the present disclosure.
Figure 7:
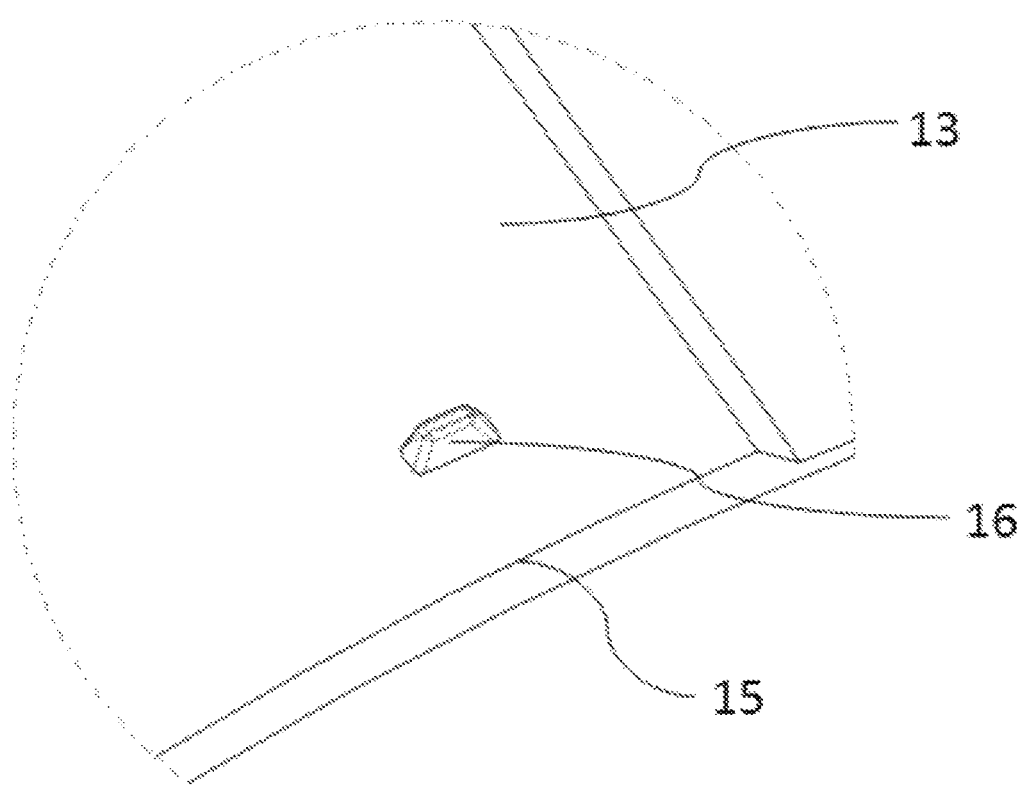
FIG. 7 is a partial enlarged view of A in FIG. 6.

Preferably, when the headlamp optical element adopts the low beam structure, a 50L dark region forming structure 16 is formed on the reflecting surface of the reflecting part 13. Referring to FIGS. 6 and 7, the 50L dark region forming structure 16 is in a convex structure protruding from the reflecting surface of the reflecting part 13. In the low beam light shape, the brightness of the 50L region 54 is specifically limited, namely 50L≤151x. By arranging the 50L dark region forming structure 16 on the reflecting surface, after light emitted from the light emitting part 12 to the 50L dark region forming structure 16 is reflected and refracted by the 50L dark region forming structure 16, a propagation direction of the part of light is changed, so that light is emitted to a region outside the 50L region 54 to reduce the brightness of the low beam 50L region 54 to comply with regulatory requirements.

Figure 8:
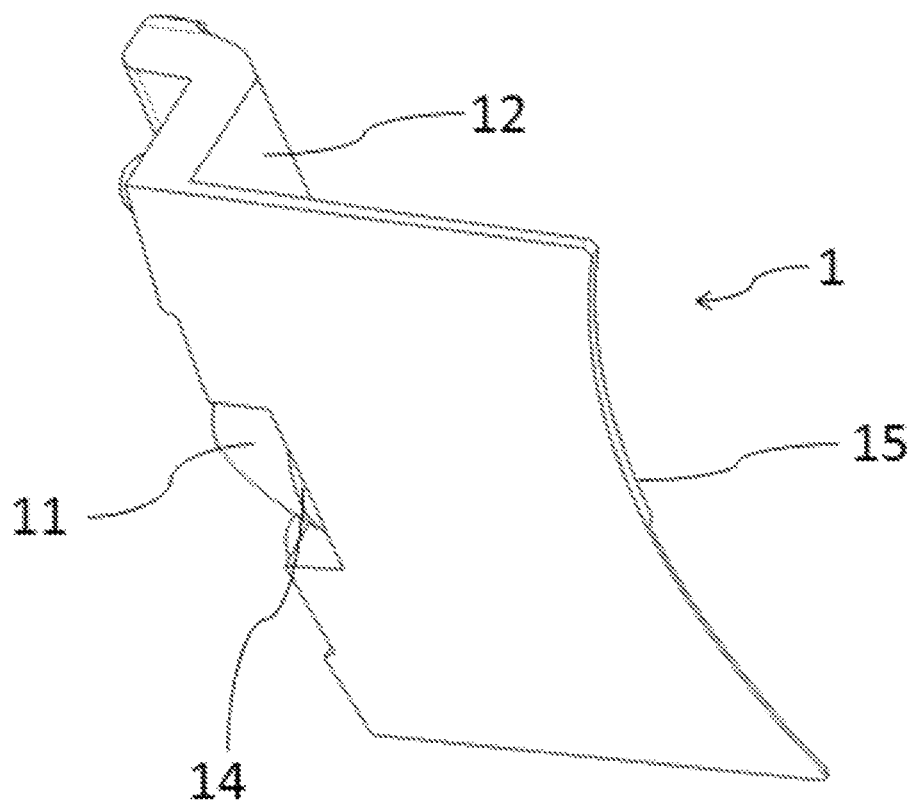
FIG. 8 is a structural schematic diagram II of the fourth embodiment of the headlamp optical element of the present disclosure.
Figure 9:
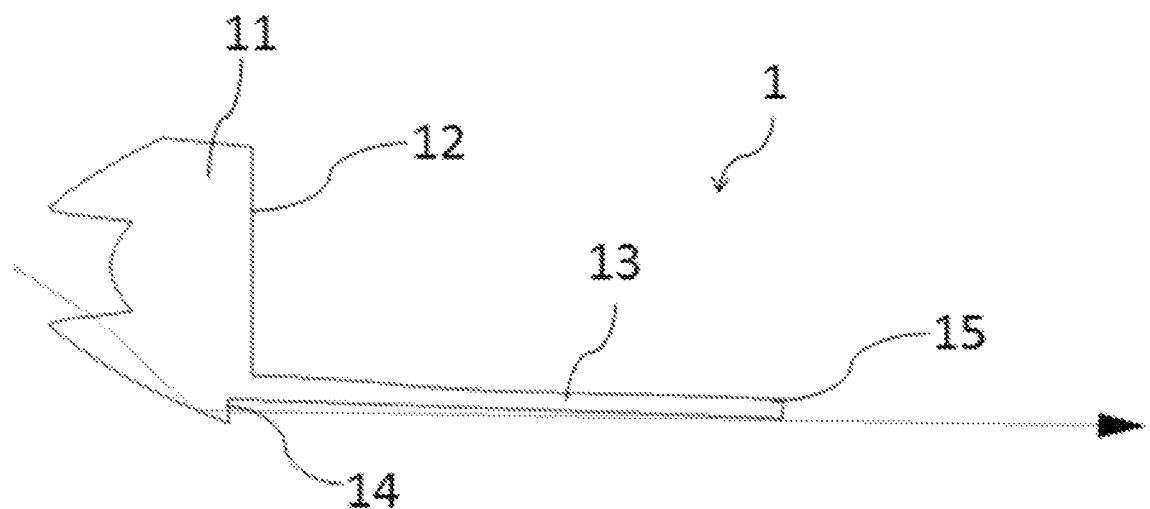
FIG. 9 is a structural schematic diagram III of the fourth embodiment of the headlamp optical element of the present disclosure.

Further preferably, referring to FIGS. 8 and 9, lower portion of the light collecting part 11 is provided with region III light shape forming structure 14 so that part of light converged by the light collecting part 11 can be emitted from the region III light shape forming structure 14 and emitted under the reflecting part 13 to form a light shape of the low beam region III 53. Region III forming structures in the prior art may be arranged at lenses, lens holders, lower surfaces of condensers, and other positions, some of the region III forming structures may affect the appearance of the lenses, and some of the region III forming structures may affect the light effect. In the headlamp optical element 1 of the present disclosure, the region III light shape forming structure 14 is arranged on the lower portion of the light collecting part 11, so that part of light from the light sources 4 is emitted through the region III light shape forming structure 14, emitted under the reflecting part 13 to the lens 2 and projected by the lens 2 to a low beam region III. In this way, not only the appearance of the lens but also the light effect cannot be affected.

Figure 4:
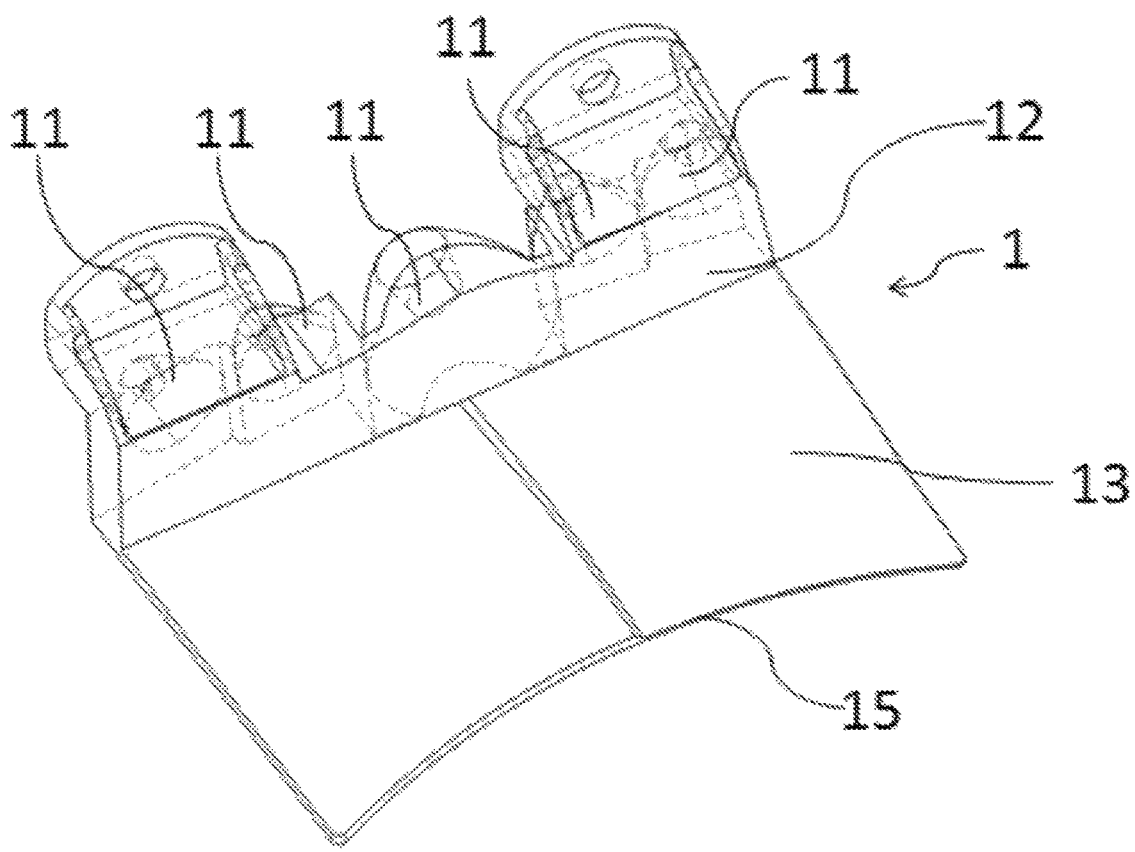
FIG. 4 is a structural schematic diagram of a second embodiment of the headlamp optical element of the present disclosure.
Figure 5:
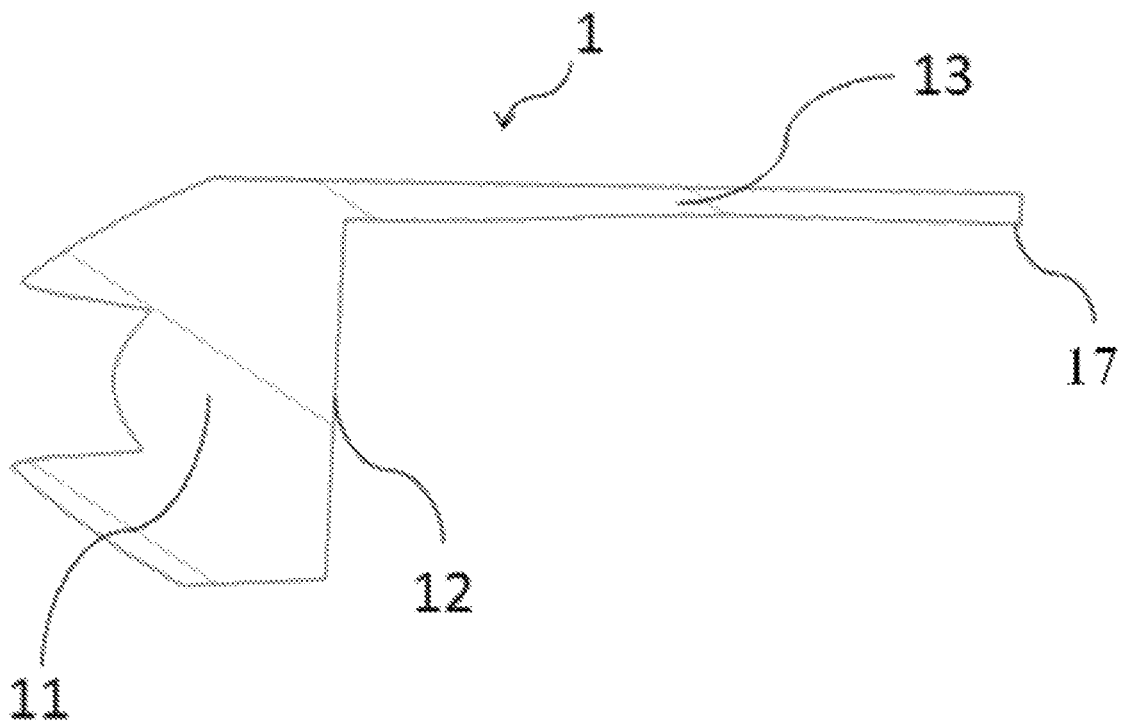
FIG. 5 is a structural schematic diagram of a third embodiment of the headlamp optical element of the present disclosure.

Specifically, referring to FIG. 4, a front end of the reflecting part 13, namely the end surface away from the light collecting parts 11 may be a smooth concave arc-shaped curved surface with a continuous curvature. Since the low beam cutoff line structure 15 or the high beam cutoff line structure 17 is arranged on the front edge of the reflecting surface of the reflecting part 13, namely an upper or lower edge of the concave arc-shaped curved surface, so that the low beam cutoff line 51 or the high beam cutoff line 52 of the vehicle light shape is clearer and sharper. Alternatively, referring to FIGS. 1 to 3, the front end of the reflecting part 13 may also be a plane.

The headlamp optical element 1 includes at least one light collecting part 11. Preferably, the headlamp optical element 1 may include two or more light collecting parts 11, referring to the headlamp optical element 1 shown in FIGS. 1 to 6, five light collecting parts 11 are arranged along a left-right direction of the reflecting part 13, the light collecting parts 11 are in one-to-one correspondence to light sources 4 respectively, and the multiple light sources 4 are arranged dispersedly, so that heat dissipation is facilitated, and the light effect of the headlamp optical element 1 can be improved by adopting the multiple light collecting parts 11.

As a preferred structural form, the ends, away from the reflecting part 13, of the light collecting part 11 is provided concave cavity, opening of the concave cavity faces the light source 4 to receive light emitted by the light source 4, outer contour surface 113 of the light collecting part 11 is curved surface of which the circumference gradually increases from the end away from the reflecting part 13 to the end close to the reflecting part 13, the light collecting part 11 can refract part of light emitted by the light source 4 to the front through front light incident surface 111 of the concave cavity, lateral light incident surface 112 of the concave cavity can refract other light emitted by the light source 4, and refracted light is reflected to the front through the outer contour surface 113, so that all light emitted from the light source 4 can be basically converged and collimated, and the purpose of increasing the light utilization rate of the light source 4 can be achieved.

Further preferably, the light collecting part 11 located at the middle position may be larger than the light collecting parts 11 located on two sides, because the middle region of the light shape formed by projection of the headlamp optical element 1 requires high illumination, and the light collecting part 11 at the middle position is made larger to be able to converge more light, thereby improving the light effect. More visually, referring to FIG. 11, the light collecting part 11 at the middle position is larger in size, correspondingly, the concave cavity of the light collecting part 11 can correspond to more LEDs, and the LED light source and the light collecting part 11 correspondingly form a light shape with a higher brightness in the middle region.

Preferably, the reflecting part 13 is provided with the reflecting surface, and the reflecting surface of the reflecting part 13 is an optical surface for receiving part of the light emitted by the light emitting part 12, and the reflecting surface of the reflecting part 13 can be additionally provided with a reflection enhancing layer to increase the light reflectivity, wherein the reflection enhancing layer may be a reflection enhancing film or a reflection enhancing coating arranged on the reflecting surface, for example, aluminizing treatment is performed on the reflecting surface of the reflecting part 13 commonly.

The headlamp optical element 1 in a preferred embodiment of the present disclosure, referring to FIG. 6, includes the light collecting parts 11, the light emitting part 12 and the reflecting part 13 which are sequentially connected. Specifically, the headlamp optical element 1 adopts a low beam structure, one end of the reflecting part 13 is connected with the lower portion of the light emitting part 12, and the other end of the reflecting part 13 is provided with the low beam cutoff line structure 15 for forming the low beam cutoff line 51, and an end surface, provided with the low beam cutoff line structure 15, of the reflecting part 13 is provided with a smooth concave arc-shaped curved surface with a continuous curvature. Five light collecting parts 11 are arranged to meet the brightness requirements of low beam, the reflecting surface of the reflecting part 13 is subjected to aluminizing treatment to improve the light effect, and the 50L dark region forming structure 16 is arranged on the reflecting surface to meet the brightness requirements of the low beam 50L region 54, and a region III light shape forming structure 14 is arranged on a lower portion of at least one light collecting part 11 to form the light shape of the low beam region III 53. According to the headlamp optical element 1 in the preferred embodiment of the present disclosure, the region III light shape forming structure 14, the 50L dark region forming structure 16 and other structures are relatively simple, special structures on outer surfaces or inner surfaces of other elements such as the lens 2 are avoided, the beauty of the vehicle lamp is improved, the light effect is ensured, and the needs of customers are met. In addition, the headlamp optical element 1 is simple in structure and more lightweight, and meets the process requirement of integral forming, so that the number of parts and the assembly processes are reduced to enable the assembled vehicle lamp to be more compact in structure; and meanwhile, the assembly error between optical elements in the assembly process can be avoided, the assembly accuracy is improved, and thus the optical accuracy can be improved.

Figure 10:
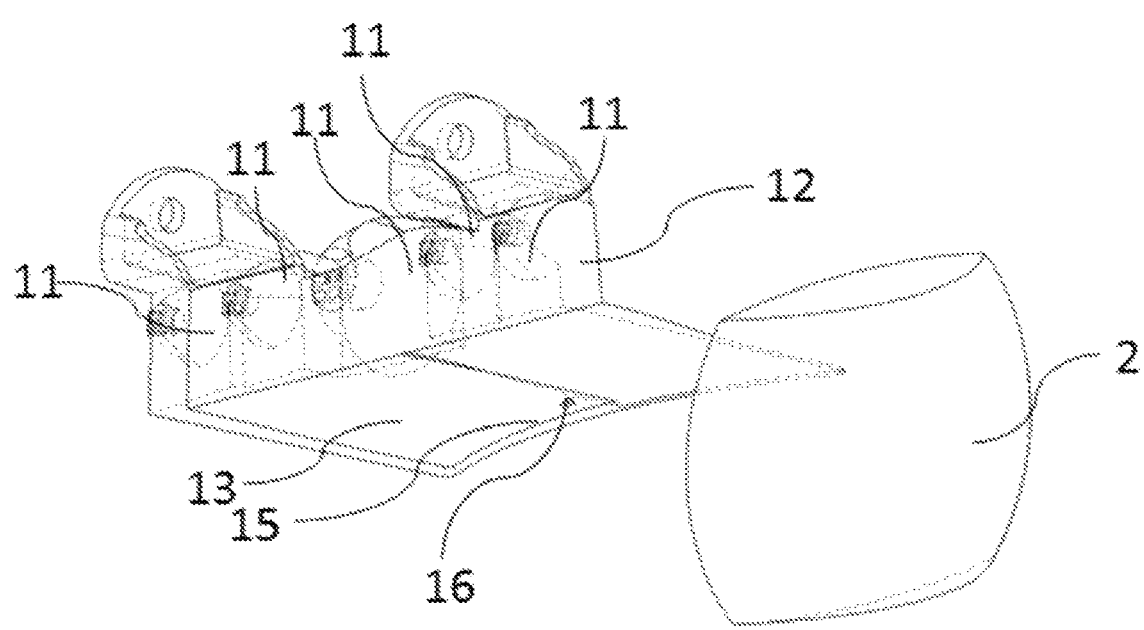
FIG. 10 is a structural schematic diagram I of a first embodiment of a headlamp module of the present disclosure.
Figure 11:
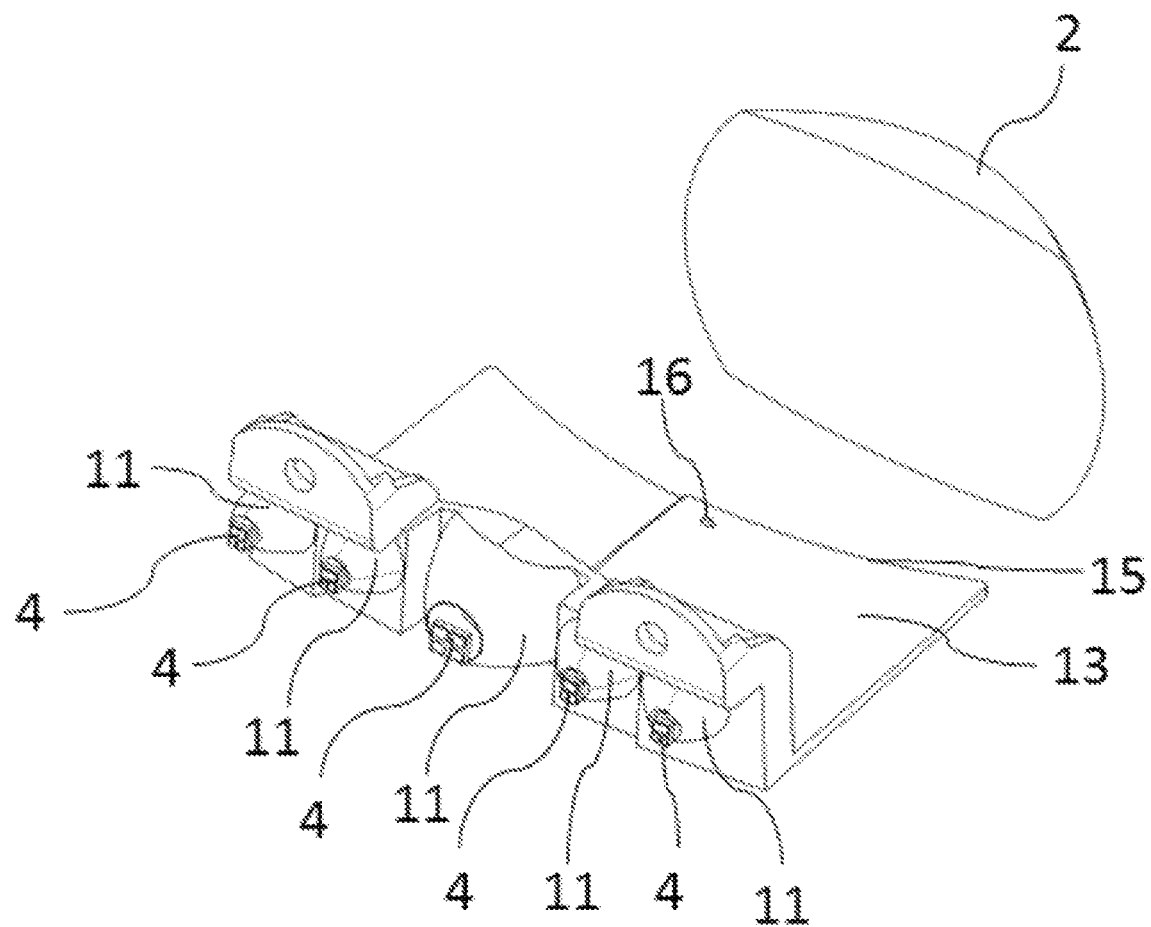
FIG. 11 is a structural schematic diagram II of the first embodiment of the headlamp module of the present disclosure.
Figure 12:
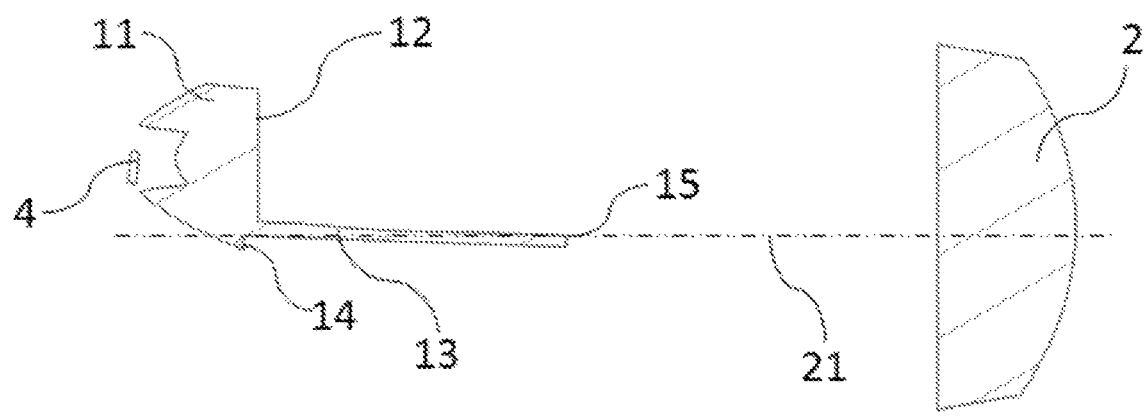
FIG. 12 is a structural schematic diagram III of the first embodiment of the headlamp module of the present disclosure.
Figure 13:
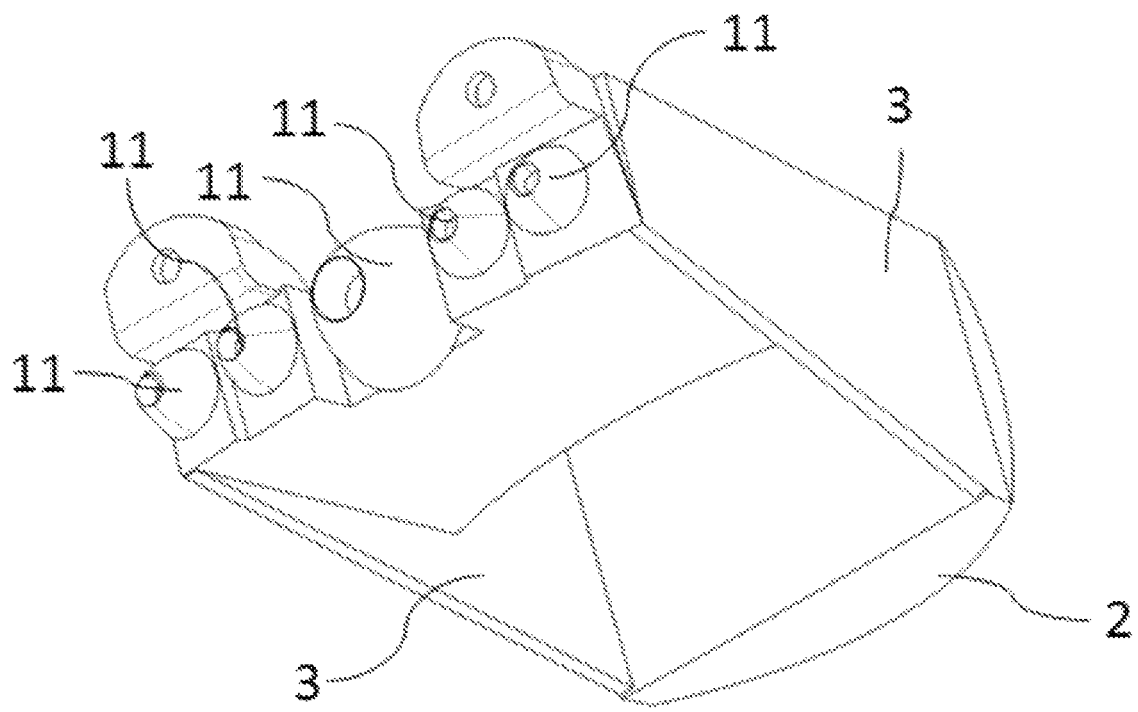
FIG. 13 is a structural schematic diagram I of a second embodiment of the headlamp module of the present disclosure.
Figure 14:
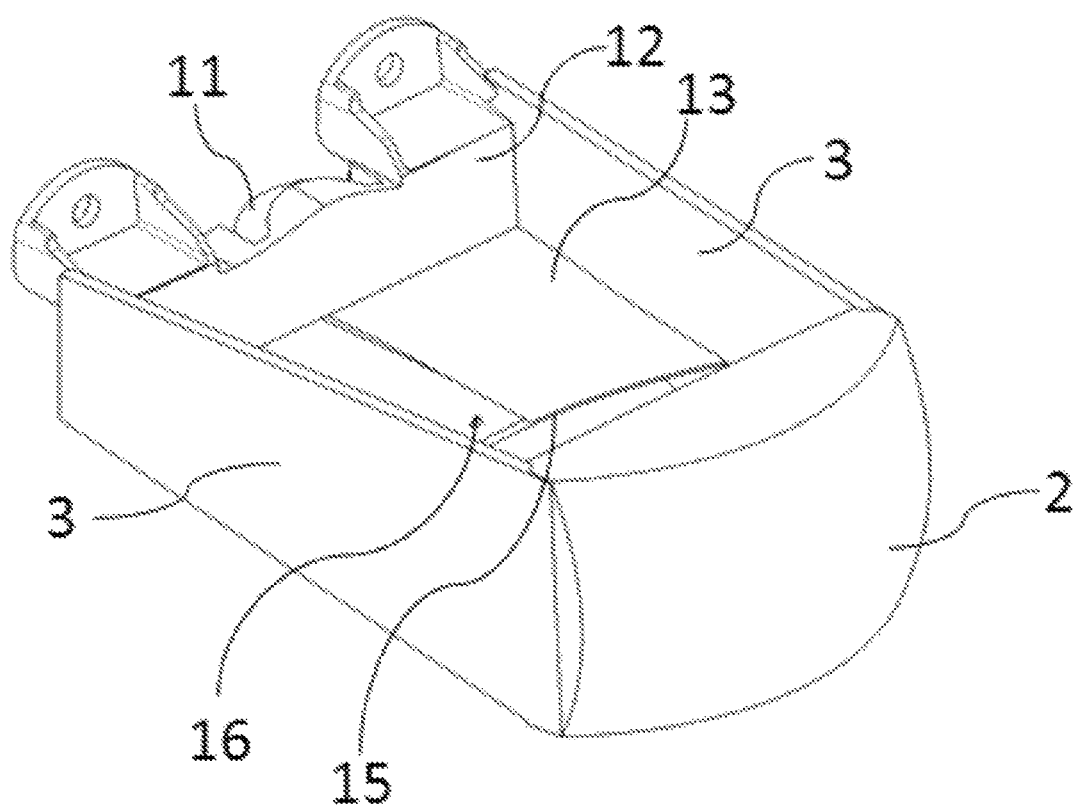
FIG. 14 is a structural schematic diagram II of the second embodiment of the headlamp module of the present disclosure.
Figure 15:
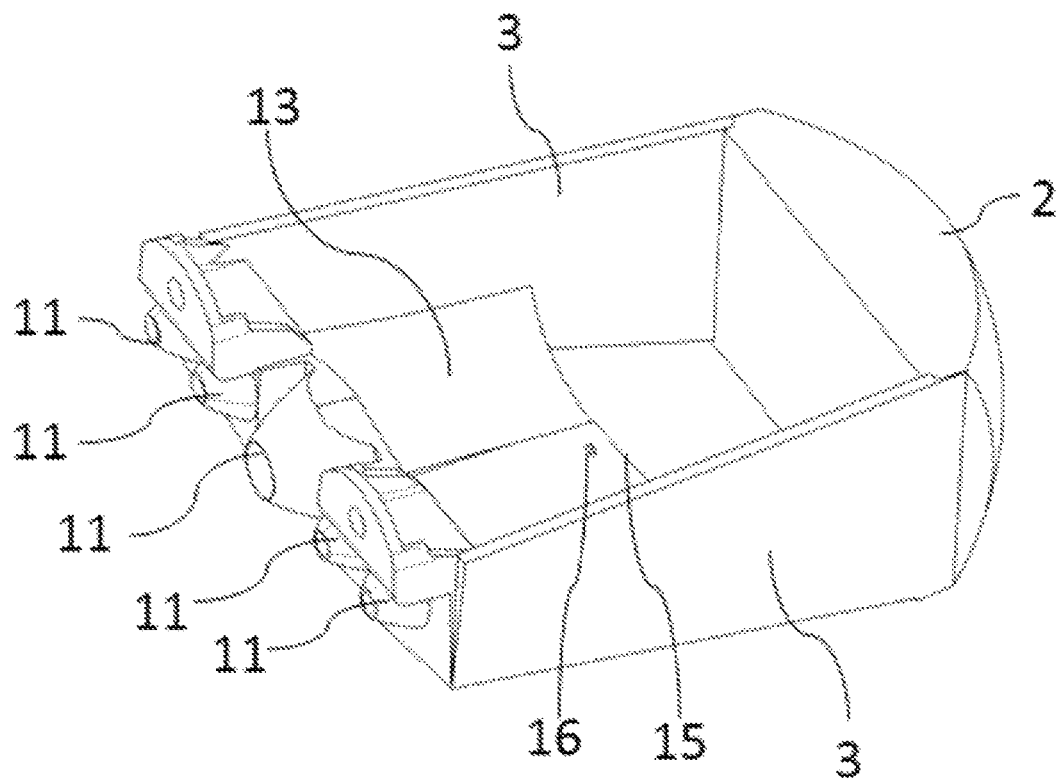
FIG. 15 is a structural schematic diagram III of the second embodiment of the headlamp module of the present disclosure.
Figure 16:
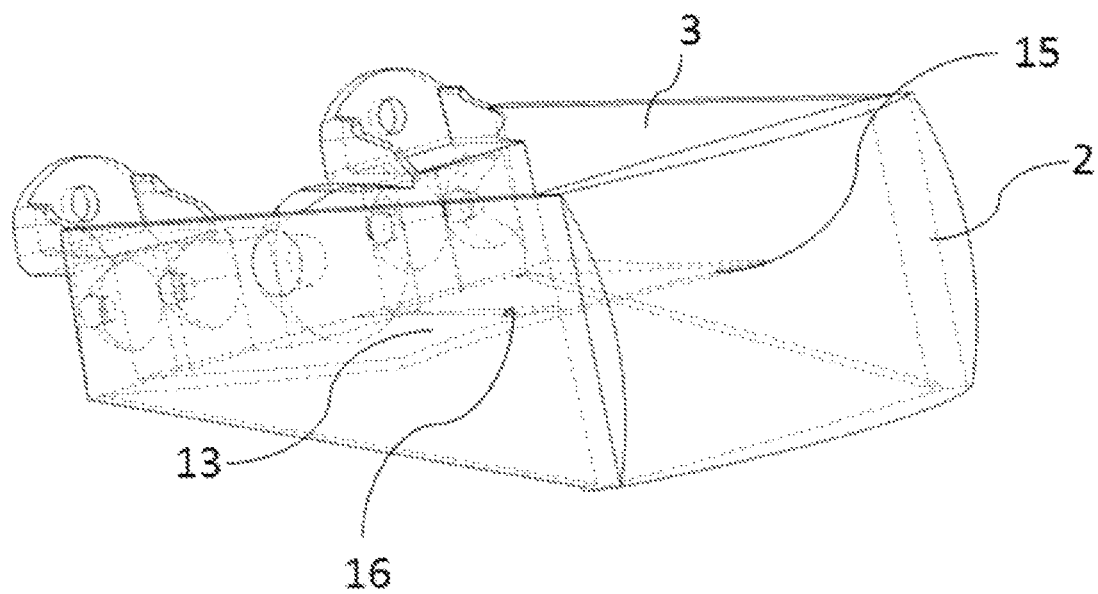
FIG. 16 is a structural schematic diagram IV of the second embodiment of the headlamp module of the present disclosure.

A headlamp module disclosed in the present disclosure includes the headlamp optical element 1 of any one of the above technical solutions, and further includes a lens 2, wherein the headlamp optical element 1 and the lens 2 may adopt a split structure. Referring to FIGS. 10 to 12, the lens 2 is arranged in the light emitting direction of the headlamp optical element 1, the headlamp optical element 1 and the lens 2 are arranged separately, more light distribution parameters are conducive to light distribution, and the headlamp optical element 1 and the lens 2 may also be flexibly arranged according to the needs of the shape of a vehicle lamp, so that the shape of the vehicle lamp is more novel and changeable, and the needs of users for personalized and technologically sensitive shape of the vehicle lamp are met. Alternatively, the headlamp optical element 1 and the lens 2 may also adopt an integrated structure, and referring to the FIGS. 13 to 16, the lens 2 and the headlamp optical element 1 are connected through connecting plates 3. In the case of such an integrated structure, the headlamp module may be made of glass, PC, PMMA or silicone and other materials to achieve integral forming, and the number of parts can be reduced, so that the assembled vehicle lamp is more compact in structure, meanwhile, the assembly error between optical elements in the assembly process can be avoided, the assembly accuracy is improved, and thus the optical accuracy can be improved.

In order to form a clear light shape, it is necessary to adjust the relative position of the reflecting part 13 and the lens 2 so that the low beam cutoff line structure 15 or the high beam cutoff line structure 17 is located in a region defined from a part at 10 mm above to a part at 10 mm below an optical axis 21 of the lens 2. Preferably, the low beam cutoff line structure 15 or the high beam cutoff line structure 17 is located in a region defined from a part at 2 mm above to a part at 2 mm below the optical axis 21 of the lens 2. Further preferably, referring to FIG. 12, the low beam cutoff line structure 15 or the high beam cutoff line structure 17 is located at the optical axis 21 of the lens 2, that is, a focal point of the lens 2 is located on the low beam cutoff line structure 15 or the high beam cutoff line structure 17, so that the formed light shape is clearer.

Figure 17:
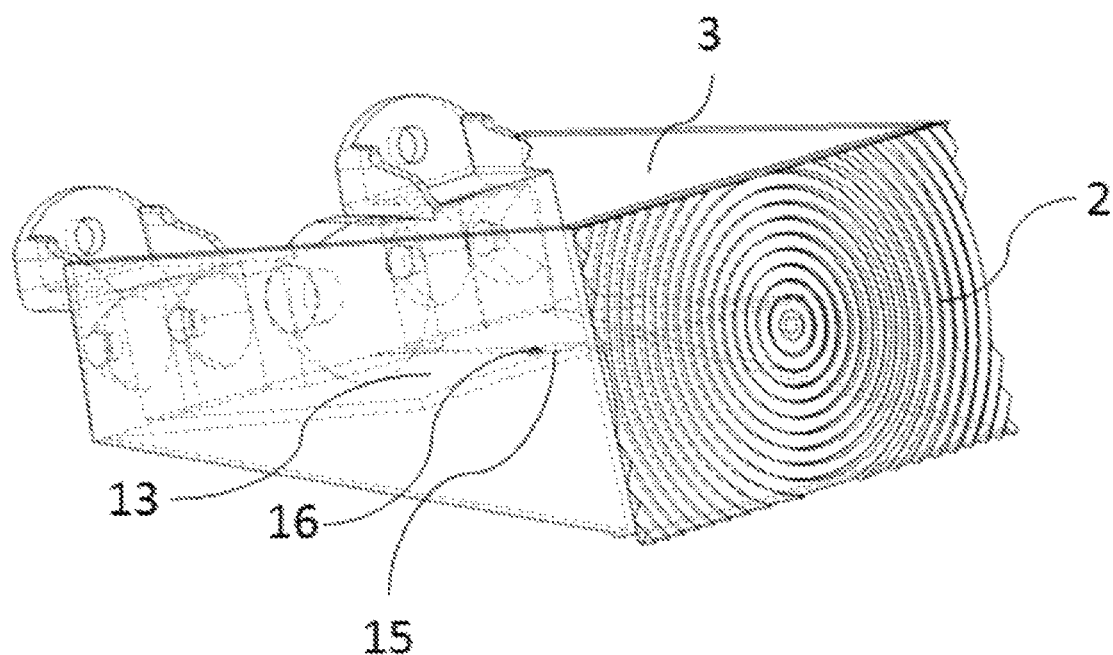
FIG. 17 is a structural schematic diagram of a third embodiment of the headlamp module of the present disclosure.

Referring to FIGS. 10 to 16, the lens 2 is a convex lens, further preferably, the lens 2 may also adopt a Fresnel lens structure shown in FIG. 17, so that the headlamp module of the present disclosure is lighter in weight and lower in cost. It is understandable that the lens 2 adopting this structure can be applied to the headlamp module in any embodiment of the present disclosure.

In the embodiment shown in FIGS. 10 to 12, the headlamp optical element 1 and the lens 2 adopt the split structure, and the headlamp optical element 1 and the lens 2 may be assembled on a mounting bracket of the headlamp module separately. The headlamp module adopting the split structure can conveniently adjust the relative positions of the headlamp optical element 1, the lens 2 and other parts, is conducive to light distribution, and can adapt to diversified shapes of vehicle lamps.

Figure 18:
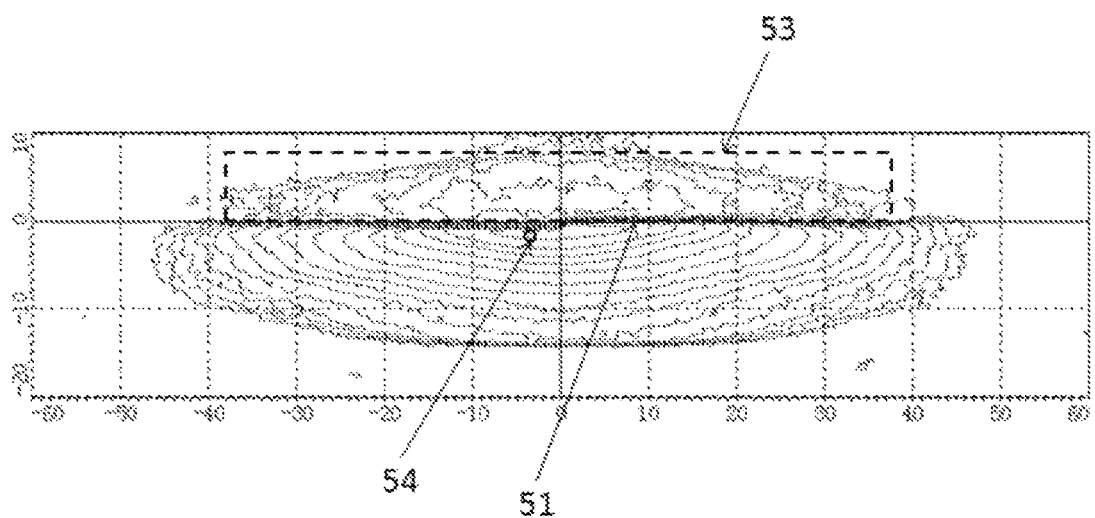
FIG. 18 is a schematic diagram of simulation of a low beam light shape formed by the headlamp module of the present disclosure.
Figure 19:
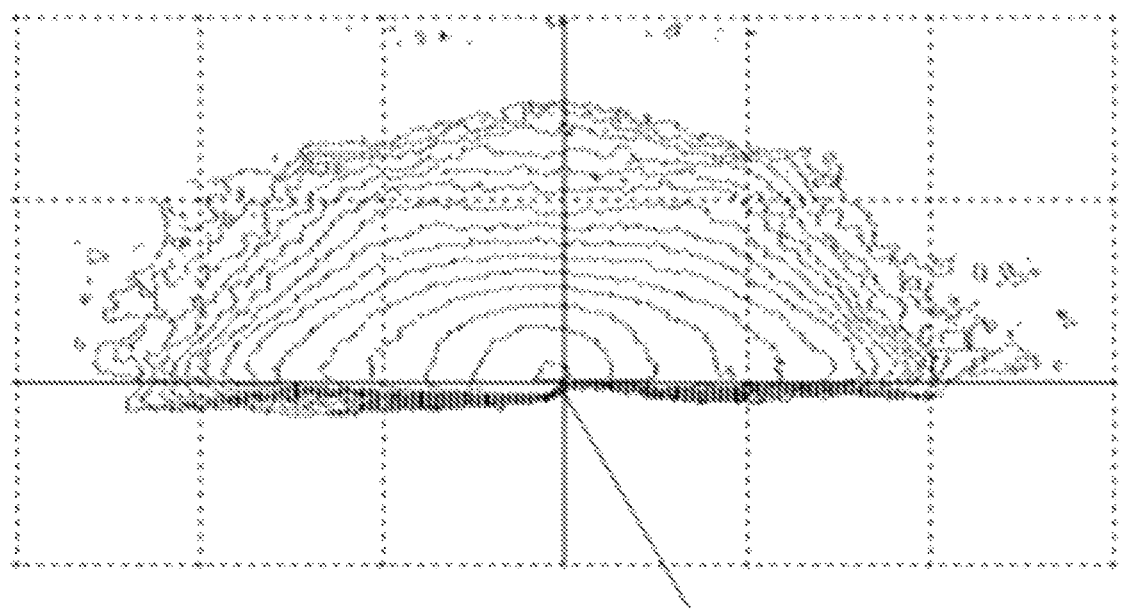
FIG. 19 is a schematic diagram of simulation of a high beam light shape formed by the headlamp module of the present disclosure.

In the embodiment shown in FIGS. 13 to 16, the headlamp optical element 1 and the lens 2 are integrally formed. When the headlamp optical element 1 adopts the low beam structure, the light source 4 are arranged at the opening of the concave cavity of the light collecting part 11, and after being converged by the light collecting part 11, a part of light is directly emitted to the lens 2; a part of light is reflected by the reflecting surface of the reflecting part 13 and then emitted to the lens 2; a part of light is emitted under the reflecting part 13 to the lens 2, after the above three parts of light are projected by the lens 2, as shown in FIG. 18, the headlamp module can form a low beam light shape with the low beam cutoff line 51 and the light shape of the region III 53, wherein the propagation direction of light emitted to the 50L dark region forming structure 16 is changed, so that the brightness of the 50L region 54 of the low beam meets the legal requirements. When the headlamp optical element 1 adopts the high beam structure, light emitted by the light source 4 is converged by the light collecting part 11, and a part of light is directly emitted to the lens 2, and the other part of the light is reflected by the reflecting part 13 and then emitted to the lens 2, and after the above two parts of light are projected by the lens 2, a high beam light shape with the high beam cutoff line 52 as shown in FIG. 19 is formed. When the headlamp module adopts the integrated structure, the number of parts can be reduced, and the assembled vehicle lamp can be more compact in structure. Meanwhile, the assembly error between optical elements in the assembly process can be avoided, the assembly accuracy is improved, thus the optical accuracy can be improved, the size of the headlamp module can be reduced, further, the production efficiency is improved, and the production cost is lowered. It should be noted that when the headlamp module adopts the integrated structure, only an optical element formed by integral formation of the headlamp optical element 1 and the lens 2 is needed to form the illumination light shape, no other optical elements are required, and thus the structure is simple. Certainly, for the needs of the shapes of the vehicle lamps, at least one inner glass lens may be arranged between the integrally formed optical element and an outer glass lens, and the inner glass lens may be a common plastic part with the same wall thickness just for the required shape, or may be a light distribution plastic part of which a back surface achieves the light distribution function.

In the embodiments shown in FIGS. 13 to 17, the lens 2 and the headlamp optical element 1 may be connected through connecting plates 3, one end of each connecting plate 3 is connected to the headlamp optical element 1, and the other end of each connecting plate 3 is connected to the lens 2. In the case of such a structure, the headlamp module can be integrally formed to improve the optical accuracy. Certainly, the lens 2 and the headlamp optical element 1 may be assembled and connected through the connecting plates 3. For example, the headlamp optical element 1, the lens 2 and the connecting plates are connected through silicone. Compared with condensers in the prior art, the reflecting part 3 arranged can save materials, reduce the cost, and make the headlamp module more lightweight.

A vehicle lamp of the present disclosure includes the headlamp module described in any one of the above technical solutions, adopts all the technical solutions of all the above embodiments, and therefore has at least all the beneficial effects brought by the technical solutions of the above embodiments.

A vehicle of the present disclosure includes the above vehicle lamp, adopts all the technical solutions of all the above embodiments, and therefore has at least all the beneficial effects brought by the technical solutions of the above embodiments.

The preferred embodiments of the present disclosure are described in detail above with reference to the accompanying drawings, but the present disclosure is not limited thereto. Within the scope of the technical concept of the present disclosure, a variety of simple modifications may be made to the technical solutions of the present disclosure, including individual specific technical features combined in any suitable manner. In order to avoid unnecessary repetition, various possible combinations are not described separately in the present disclosure. However, these simple modifications and combinations should also be regarded as the contents disclosed in the present disclosure, and belong to the protection scope of the present disclosure.

What is claimed is:

1. A headlamp optical element, comprising a light collecting part, a light emitting part and a reflecting part which are connected in sequence along a light emitting direction, wherein one end of the reflecting part is connected with a lower portion of the light emitting part, and the other end of the reflecting part is provided with a low beam cutoff line structure for forming a low beam cutoff line;

the low beam cutoff line structure is arranged on a front edge of a reflecting surface of the reflecting part; the light collecting part is a light concentrating cup structure, an end of the light collecting part away from the reflecting part is provided with a concave cavity, the concave cavity comprises a front light incident surface and a lateral light incident surface, the front light incident surface is a curved surface protruding to a side away from the reflecting part, the lateral light incident surface is a curved surface of which the circumference gradually decreases from an end away from the reflecting part to an end close to the reflecting part, and an outer contour surface of the light collecting part is a curved surface of which the circumference gradually increases from the end away from the reflecting part to the end close to the reflecting part; a lower portion of the light collecting part is provided with a region III light shape forming structure, part of light converged by the light collecting part can be emitted from the region III light shape forming structure and emitted under the reflecting part to form a light shape of a low beam region III.

2. The headlamp optical element according to claim 1, wherein a 50L dark region forming structure is formed on the reflecting surface, provided with the low beam cutoff line structure, of the reflecting part, and light emitted from the light emitting part to the 50L dark region forming structure can be reflected and refracted by the 50L dark region forming structure so that the brightness of a low beam 50L region can be lowered.

3. The headlamp optical element according to claim 1, wherein an end surface of the reflecting part away from the light collecting part is a smooth concave arc-shaped curved surface with a continuous curvature.

4. The headlamp optical element according to claim 1, wherein the number of the light collecting parts is two or more.

5. The headlamp optical element according to claim 1, wherein the reflecting surface of the reflecting part is provided with a reflection enhancing layer.

6. A headlamp module, comprising the headlamp optical element according to claim 1 and a lens, wherein the headlamp optical element and the lens are in a split structure, and the lens is arranged in a light emitting direction of the headlamp optical element; or the headlamp optical element and the lens are in an integrated structure, and the lens and the headlamp optical element are connected through connecting plates.

7. The headlamp module according to claim 6, wherein the low beam cutoff line structure is located in a region defined from a part at 10 mm above to a part at 10 mm below an optical axis of the lens.

8. The headlamp module according to claim 6, wherein the lens is a convex lens or a Fresnel lens structure.

9. The headlamp module according to claim 6, wherein a 50L dark region forming structure is formed on the reflecting surface, provided with the low beam cutoff line structure, of the reflecting part, and light emitted from the light emitting part to the 50L dark region forming structure can be reflected and refracted by the 50L dark region forming structure so that the brightness of a low beam 50L region can be lowered.

10. The headlamp module according to claim 6, wherein an end surface of the reflecting part away from the light collecting part is a smooth concave arc-shaped curved surface with a continuous curvature.

11. The headlamp module according to claim 6, wherein the number of the light collecting parts is two or more.

12. The headlamp module according to claim 6, wherein the reflecting surface of the reflecting part is provided with a reflection enhancing layer.

13. A vehicle lamp, comprising the headlamp module according to claim 6.

14. The vehicle lamp according to claim 13, wherein a 50L dark region forming structure is formed on the reflecting surface, provided with the low beam cutoff line structure, of the reflecting part, and light emitted from the light emitting part to the 50L dark region forming structure can be reflected and refracted by the 50L dark region forming structure so that the brightness of a low beam 50L region can be lowered.

15. The vehicle lamp according to claim 13, wherein an end surface of the reflecting part away from the light collecting part is a smooth concave arc-shaped curved surface with a continuous curvature.

16. The vehicle lamp according to claim 13, wherein the number of the light collecting parts is two or more.

17. The vehicle lamp according to claim 13, wherein the reflecting surface of the reflecting part is provided with a reflection enhancing layer.

18. The vehicle lamp according to claim 13, wherein the low beam cutoff line structure is located in a region defined from a part at 10 mm above to a part at 10 mm below an optical axis of the lens.

19. The vehicle lamp according to claim 13, wherein the lens is a convex lens or a Fresnel lens structure.

* * * * *